UNITED STATES PATENT OFFICE 2,692,080

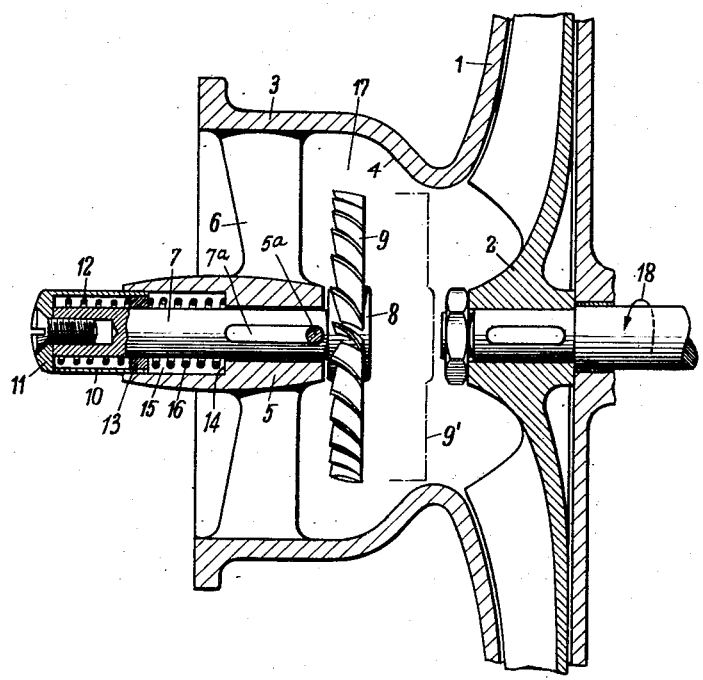

CONTROL DEVICE FOR A FLOWING MEDIUM

Odilo Schwaiger, Stuttgart-Unterturkheim, Germany, assignor to Daimler-Benz Aktiengesellschaft, Stuttgart-Unterturkheim, Germany Application February 7, 1951, Serial No. 209,827

Claims priority, application Germany February 10, 1950

3 Claims. (Cl. 230—114)

This invention relates to a control device for a flowing medium, particularly for controlling the induction pressure of superchargers of internal combustion engines, preferably motor vehicle engines, by employing so-called rotary induction diffusers, i. e. those which cause rotary induction of the medium.

An important object of the invention is to enable the control of rotary induction by means of a non-revolving diffuser, under favorable efficiency, in any control position of the diffuser.

Another object of the invention is to provide a control device which is simpler in design and cheaper to build than known devices.

The size and speed of superchargers in internal combustion engines is generally so selected that already in the medium speed range of the internal combustion engine the greatest possible torque of the same is attained, that is, the full induction pressure is already attained at approximately ⅔ of the normal engine speed. A further increase of induction pressure, at an engine speed exceeding that ratio must be prevented. The more generally used control by means of throttling has the disadvantage that it produces too great a deviation from the boost characteristic and leads to the formation of eddies within the fan blades. The requisite power for this is completely converted into heat, that is, in heating of the induction air, and considerably prejudices both the volumetric efficiency and the thermal efficiency of the supercharged engine.

In order to obviate this disadvantage so-called rotary induction diffusers have already been provided on the intake side of superchargers. These are diffusers with fan blades which are interposed between intake and rotor and impart rotary flow to the air before it enters the rotor. The control is accomplished by varying the pitch of the blades. Such a rotary induction diffuser, without prejudice to the flow, effects only a limitation of the difference in effective peripheral speeds and thus the degree of compression of the supercharger. However, in the requisite construction the pitch variation mechanism is relatively expensive.

As compared to this, a feature of the invention consists therein that a non-revolving rotary induction diffuser is provided for controlling the pressure of a flowing medium, particularly the induction pressure of a blower. This diffuser is arranged to be axially shiftable, but non-rotatable, in front of the narrowed portion of a duct, so that a variable throttling at the point where the duct narrows is rendered possible by shifting the rotary induction diffuser.

A further feature of the invention consists in a resilient support of the rotary induction diffuser in a manner whereby it is held spaced apart from the neck of the duct by spring means and can be shifted, against the spring tension, by the pressure of flow.

The above and other objects and features of the invention will be apparent as the description proceeds and throughout this description reference will be made to the accompanying drawing in which one embodiment of the invention is illustrated in an axial sectional view through the eye of the supercharger for a motor vehicle engine. The blower in the form of a radial-type supercharger consists, in a known manner, of housing, a portion of the volute of which is shown at 1, and rotor 2 which is driven at a relatively high speed in the direction of the arrow 18 by the internal combustion engine, serving for driving the vehicle, by means of a transmission gearing. The speed of the blower as compared to that of the prime mover is so selected that the blower delivers already the full induction pressure when the shaft of the prime mover has attained approximately ⅔ of its highest operative speed. Consequently, on further increase of engine speed a throttling of the induction air must take place which is automatically achieved with relatively little loss of power by means of the device now to be described.

The intake duct 3 of the supercharger is tapered to form a restricted portion 4 toward the rotor 2. A supporting body 5 is fixed on radial spokes 6 at the outer end of the intake duct 3 and a shaft 7 is axially shiftable, but non-rotatable, supported in the said body 5. The shaft 7 has a longitudinal keyway 7a engaged by a pin 5a extending through one side of the body 5. The hub 8, of a non-revolving rotary induction diffuser provided with fixed fan blades 9, is rigidly secured or integral with the inner end of the shaft 7. An abutment means, preferably in the form of a sleeve 10 is fastened to the outer end of the shaft 7, and one end of a coil spring 12 is seated against this abutment or the bottom 11 of this sleeve. The other end of this spring is seated against a ring 13 which is longitudinally slidable in the sleeve 10 and guided on the shaft 7. Between this ring and a shoulder 14 in the bore 15 of the body 5 there is arranged a second, stronger, spring 16. Under the effect of these two springs 12, 16, the rotary induction diffuser 8, 9 holds the position of rest shown on the drawing, in which it is in the widest cross-sectional portion of the restricted portion 4 of the intake duct.

The initial tension of the springs 12, 16 is so calibrated that the rotary induction diffuser remains in its position of rest until the blower, with increasing speed, has reached the full induction pressure. The air drawn by the blower, up till then, passes essentially through the annular space 17 surrounding the rotary induction diffuser; the rotary flow imparted upon the air being not yet substantial.

However, on further increase of the driving speed of the blower the rotary induction diffuser is pulled by the increasing suction, against the action of the springs 12, 16, more and more into the restricted portion 4 of the duct until, at the highest operative speed, it is in the position 9'. Owing to the fact that the restricted portion 4 narrows the free cross-sectional area 17, the air drawn by the blower must now pass more and more through the rotary induction diffuser, in which a rotary flow in the direction of rotation of the rotor is imparted thereto. Thus a throttling of the inducted amount of air takes place which is free of appreciable losses.

On the advancement of the rotary induction diffuser from its position of rest 9 to the innermost position 9', first the weaker spring 12 is compressed and then the stronger spring 16. Thus there is obtained a spring characteristic with an interrupted, steeper, ascending curve in the last part of the spring travel.

In place of several coil springs of different tension, a conical helical spring, or any other form of differential spring means can be used whose tension, on compressing, increases with more than linear progression. It is merely required, in each case, that the spring be so calibrated that, in the higher speed range of the blower, it yields, at the proper time, so much to the increasing suction exerted upon the rotary induction diffuser, as is requisite, at the respective speed, for obtaining an advantageous throttling effect or rotary induction effect.

The invention is not limited or restricted to the specific embodiment illustrated and described herein but may be varied within the scope of the several inventive concepts.

What is claimed is:
1. A control device for superchargers of internal combustion engines including a housing defining an annular portion of a volute chamber, a substantially cylindrical inlet portion and a substantially conical restricted portion therebetween narrowing toward said annular portion, and a rotor rotatably mounted in the annular portion, said device comprising a support member fixedly mounted in said inlet portion and defining therewith a divided ring-shaped inlet passage within said inlet portion, a shaft member mounted for axial sliding movement in said support member, means in said support member cooperating with said shaft member for restraining said shaft member against rotary movement, a fan-like damper fixed on said shaft member on the end thereof which extends from said support member towards said restricted portion for axial movement toward and away from the restricted portion, an abutment on said shaft on the end opposite to first said end, and spring means between said support member and said abutment concentric with said shaft member so as to move said shaft member together with said damper away from said restricted portion, the spring means being so constructed that the force of the spring increases as the damper approaches the restricted portion.

2. A device as in claim 1 wherein the spring means comprise at least two springs mounted in series between said support member and said abutment, said springs having different spring force characteristics so that axial movement of said shaft member compresses the harder spring substantially only after the softer spring has been fully compressed.

3. A device as in claim 1 wherein said support member is hollow-shaped and defines a cylindrical recess adjacent to said abutment, in combination with a sleeve on said abutment axially slidable in said recess and concentrically spaced with respect to said shaft member, a ring member positioned between said shaft member and said sleeve and slidable with respect to said shaft member and said sleeve, said spring means comprising a first spring concentric with said shaft member between said abutment and said ring member and a second spring concentric with said shaft member between said ring member and said support member, one of said springs being harder than the other spring.

References Cited in the file of this patent

UNITED STATES PATENTS

| Number | Name | Date |
| --- | --- | --- |
| 1,787,654 | Anderson | Jan. 6, 1931 |
| 2,400,240 | Lincoln | May 14, 1946 |

FOREIGN PATENTS

| Number | Country | Date |
| --- | --- | --- |
| 64,498 | Denmark | May 6, 1946 |
| 109,611 | Great Britain | Dec. 24, 1918 |
| 280,189 | Germany | Dec. 27, 1913 |
| 382,485 | Great Britain | Oct. 27, 1932 |